United States Patent
Wang et al.

(10) Patent No.: US 12,339,725 B2
(45) Date of Patent: Jun. 24, 2025

(54) METHOD FOR POWERING ON SMART NETWORK INTERFACE CARD

(71) Applicant: SUZHOU METABRAIN INTELLIGENT TECHNOLOGY CO., LTD., Jiangsu (CN)

(72) Inventors: Haibo Wang, Jiangsu (CN); Zhihua Ge, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/863,255

(22) PCT Filed: Jun. 16, 2023

(86) PCT No.: PCT/CN2023/100835
§ 371 (c)(1),
(2) Date: Nov. 5, 2024

(87) PCT Pub. No.: WO2024/113767
PCT Pub. Date: Jun. 6, 2024

(65) Prior Publication Data
US 2025/0110539 A1     Apr. 3, 2025

(30) Foreign Application Priority Data

Dec. 1, 2022  (CN) .......................... 202211529494.3

(51) Int. Cl.
*G06F 1/32*       (2019.01)
*G06F 1/3206*   (2019.01)
(Continued)

(52) U.S. Cl.
CPC .......... *G06F 1/3206* (2013.01); *G06F 1/3287* (2013.01); *G06F 1/3296* (2013.01)

(58) Field of Classification Search
CPC ..... G06F 1/3206; G06F 1/3287; G06F 1/3296
See application file for complete search history.

(56) References Cited

U.S. PATENT DOCUMENTS

2013/0239154 A1   9/2013  Bagasra
2023/0077521 A1*  3/2023  Ballard ................. H04L 61/103
                                                                   370/392
(Continued)

FOREIGN PATENT DOCUMENTS

CN     111414201 A     7/2020
CN     112394801 A     2/2021
(Continued)

OTHER PUBLICATIONS

International Search Report and Written Opinion for International Application No. PCT/CN2023/100835 mailed Jul. 19, 2023, with English translation of Search Report.
(Continued)

*Primary Examiner* — Stefan Stoynov
(74) *Attorney, Agent, or Firm* — Merchant & Gould P.C.

(57) ABSTRACT

Disclosed are a method for powering on a smart network interface card. The method includes: obtaining power on indication information and interface bandwidth information from a target smart network interface card by a main board (S102); adjusting a working state to a target working state by the main board according to the power on indication information (S104); sending a clock control signal and a power control signal to the target smart network interface card by the main board, and causing the target smart network interface card to be powered on according to the clock control signal and the power control signal that are received (S106); and performing bifurcation on a communication bandwidth by the main board according to the interface bandwidth information, and obtaining a target bandwidth
(Continued)

type, where the target bandwidth type is configured to match the bandwidth type of the target smart network interface card (S108).

20 Claims, 6 Drawing Sheets

(51) Int. Cl.
  *G06F 1/3287* (2019.01)
  *G06F 1/3296* (2019.01)

(56) References Cited

U.S. PATENT DOCUMENTS

| | | | |
|---|---|---|---|
| 2023/0229558 A1* | 7/2023 | Warkentin | G06F 11/0757 714/55 |
| 2024/0006791 A1* | 1/2024 | Wang | H01R 43/26 |

FOREIGN PATENT DOCUMENTS

| | | | |
|---|---|---|---|
| CN | 113645049 A | 11/2021 | |
| CN | 115145769 A | 10/2022 | |
| CN | 115599191 A | 1/2023 | |
| WO | 2024113767 A1 | 6/2024 | |

OTHER PUBLICATIONS

Chinese Office Action received for CN Application No. 202211529494.3 on Feb. 3, 2023, 12 pgs.
Chinese Decision to Grant received for CN Application No. 202211529494.3 on Feb. 28, 2023, 2 pgs.

* cited by examiner

METHOD FOR POWERING ON SMART NETWORK INTERFACE CARD

CROSS-REFERENCE TO RELATED APPLICATION

The present application is a National Stage Application of PCT International Application No.: PCT/CN2023/100835 filed on Jun. 16, 2023, which claims priority to Chinese Patent Application 202211529494.3, filed in the China National Intellectual Property Administration on Dec. 1, 2022, the disclosure of which is incorporated herein by reference in its entirety.

TECHNICAL FIELD

Examples of the disclosure relate to the field of computers, in particular to a method for powering on a smart network interface card.

BACKGROUND

In recent years, as the domestic application market expands and various mass data arise, a variety of acceleration technologies have emerged on the basis of big data, cloud computing and artificial intelligence. For example, a graphics processing unit (GPU), a field programmable gate array (FPGA) accelerator card and a smart network interface card prevail in the market of the acceleration technologies.

These three accelerator cards are all peripheral component interconnect express (PCIE) devices mainly made by manufacturer giants in Europe and America. Smart network interface cards from different manufacturers start to operate in an S5 state (a device shutdown state) or an S0 (a device active state) state of servers in consideration of application scenarios, and a main board is required to provide 100 Mhz clock signals, power signals and reset signals in the S5 state and the S0 state respectively. That is, smart network interface cards in the current market have varying requirements for the clock signals, the power signals and the reset signals when applied to a complete server system. However, in recent years, the emerging artificial intelligence and big data put forward increasing demand for smart network interface cards of AI servers and general-purpose servers. The smart network interface cards from various manufacturers will be integrated into the complete server system on a larger scale, and require the main board to provide the power signals, the clock signals and the reset signals in the S5 state or the S0 state. Thus new challenges are presented to server system manufacturers.

In view of this, it is a pressing technical problem to energize smart network interface cards from different manufacturers with one board and satisfy system design requirements.

SUMMARY

Examples of the disclosure provide a method for powering on a smart network interface card, which at least solve the problem that a same main board cannot satisfy power on demands from different smart network interface cards in the related art.

According to an example of the disclosure, a method for powering on a smart network interface card is provided. The method includes: obtaining power on indication information and interface bandwidth information from a target smart network interface card by a main board, where the power on indication information is configured to indicate an power on state required by the target smart network interface card, a target power on state required by the target smart network interface card corresponds to a target working state of the main board, and the interface bandwidth information is configured to indicate a bandwidth type of the target smart network interface card; adjusting a working state to a target working state by the main board according to the power on indication information; sending a clock control signal and a power control signal to the target smart network interface card by the main board, and causing the target smart network interface card to be powered on according to the clock control signal and the power control signal that are received; and performing bifurcation on a communication bandwidth by the main board according to the interface bandwidth information, and obtaining a target bandwidth type, where the target bandwidth type is configured to match the bandwidth type of the target smart network interface card.

In an illustrative example, the main board includes a field programmable gate array (FPGA), and the obtaining power on indication information from a target smart network interface card by a main board includes: sending an obtainment request to the target smart network interface card through an inter-integrated circuit (I2C) interface by the FPGA, and causing the target smart network interface card to respond to the obtainment request and send the power on indication information; and receiving the power on indication information by the FPGA.

In an illustrative example, the main board further includes a voltage regulator chip and a clock buffer, and the sending a clock control signal and a power control signal to the target smart network interface card by the main board includes: sending an enable signal to the voltage regulator chip and the clock buffer by the FPGA according to the target working state; sending the clock control signal to the target smart network interface card by the clock buffer according to the enable signal; and sending the power control signal to the target smart network interface card by the voltage regulator chip according to the enable signal.

In an illustrative example, the sending an enable signal to the voltage regulator chip and the clock buffer by the FPGA according to the target working state includes: determining whether the target working state is a first state by the FPGA, where the first state is an power on state or a power off state; sending a first enable signal to the voltage regulator chip and the clock buffer by the FPGA under the condition a determination result indicates yes, sending a first clock control signal corresponding to the first state by the clock buffer under the condition of receiving the first enable signal, and sending a first power control signal corresponding to the first state by the voltage regulator chip under the condition of receiving the first enable signal; and determining the target working state as a second state and sending a second enable signal to the voltage regulator chip and the clock buffer by the FPGA under the condition a determination result indicates no, sending a second clock control signal corresponding to the second state by the clock buffer under the condition of receiving the second enable signal, and sending a second power control signal corresponding to the second state by the voltage regulator chip under the condition of receiving the second enable signal, where the second state and the first state are the power on state and the power off state respectively.

In an illustrative example, the sending a clock control signal and a power control signal to the target smart network interface card by the main board further includes: sending a reset signal to the target smart network interface card by the FPGA.

In an illustrative example, the obtaining interface bandwidth information from a target smart network interface card by a main board includes: receiving an indication signal from a second interface of a riser board by the FPGA through a first interface, and causing the riser board to forward the indication signal from the target smart network interface card, where the first interface and the riser board are interconnected, the first interface has the same bandwidth as the communication bandwidth, the riser board and the target smart network interface card are interconnected through the second interface, and a numerical value of the indication signal is configured to indicate the bandwidth type of the target smart network interface card.

In an illustrative example, the main board further includes a platform controller hub, and the performing bifurcation on a communication bandwidth by the main board according to the interface bandwidth information, and obtaining a target bandwidth type include: sending the indication signal to the platform controller hub by the FPGA; performing bifurcation on the output bandwidth by the platform controller hub through a basic input output system according to the numerical value of the indication signal, and causing the first interface to have the target bandwidth type; and identifying the target smart network interface card by a central processing unit (CPU) under the condition that the target bandwidth type is the same as the bandwidth type of the target smart network interface card, and matching the target smart network interface card with the CPU under the condition that the CPU identifies the target smart network interface card.

According to another example of the disclosure, a method for powering on a smart network interface card is provided. The method includes: sending power on indication information to a main board by a target smart network interface card, and causing the main board to adjust a working state to a target working state according to the power on indication information, where the power on indication information is configured to indicate a target power on state required by the target smart network interface card, and the target power on state corresponds to the target working state of the main board; receiving a clock control signal and a power control signal that are sent by the main board and getting powered on according to the clock control signal and the power control signal by the target smart network interface card; and sending interface bandwidth information to the main board by the target smart network interface card, causing the main board to perform bifurcation on a communication bandwidth according to the interface bandwidth information, and obtaining a target bandwidth type matching the target smart network interface card, where the interface bandwidth information includes a bandwidth type.

In an illustrative example, the target smart network interface card includes a field replaceable unit, and the sending power on indication information to a main board by a target smart network interface card includes: receiving an obtainment request from the main board by the field replaceable unit through an I2C interface; and sending the power on indication information by the field replaceable unit under the condition of receiving the obtainment request.

In an illustrative example, the sending interface bandwidth information to the main board by the target smart network interface card includes: sending an indication signal to a riser board by the target smart network interface card, and causing the riser board to forward the indication signal to the main board, where a numerical value of the indication signal is configured to indicate the bandwidth type.

In an illustrative example, the method further includes: receiving a reset signal from the main board by the target smart network interface card.

According to yet another example of the disclosure, a method for powering on a smart network interface card is provided. The method includes: obtaining power on indication information from a target smart network interface card by a riser board, where the power on indication information is configured to indicate a target power on state required by the target smart network interface card, and the target power on state corresponds to a target working state of a main board; forwarding the power on indication information to the main board by the riser board, causing the main board to adjust a working state to the target working state and send a clock control signal and a power control signal, and powering on the target smart network interface card according to the clock control signal and the power control signal that are received; obtaining interface bandwidth information of the target smart network interface card by the riser board, where the interface bandwidth information is configured to indicate a bandwidth type of the target smart network interface card; and forwarding the interface bandwidth information to the main board by the riser board, causing the main board to perform bifurcation on a communication bandwidth according to the interface bandwidth information, and obtaining a target bandwidth type, where the target bandwidth type is configured to match the bandwidth type of the target smart network interface card.

According to yet another example of the disclosure, an apparatus for powering on a smart network interface card is provided. The apparatus includes: an obtainment module configured to obtain power on indication information and interface bandwidth information from a target smart network interface card by using a main board, where the power on indication information is configured to indicate an power on state required by the target smart network interface card, a target power on state required by the target smart network interface card corresponds to a target working state of the main board, and the interface bandwidth information is configured to indicate a bandwidth type of the target smart network interface card; an adjustment module configured to adjust a working state to the target working state by using the main board according to the power on indication information; a sending module configured to send a clock control signal and a power control signal to the target smart network interface card by using the main board, and cause the target smart network interface card to be powered on according to the clock control signal and the power control signal that are received; and a bifurcation module configured to perform bifurcation on a communication bandwidth by using the main board according to the interface bandwidth information, and obtain a target bandwidth type, where the target bandwidth type is configured to match the bandwidth type of the target smart network interface card.

According to the yet another example of the disclosure, a computer-readable nonvolatile storage medium is further provided. The computer-readable nonvolatile storage medium stores a computer program, where the computer program is configured to execute steps of any method example described above when running.

According to still another example of the disclosure, an electronic device is further provided. The electronic apparatus includes a memory and a processor, where the memory stores a computer program, and the processor is configured to execute steps of any method example described above by running the computer program.

According to the disclosure, the main board can adjust its own working state according to the power on state required by the target smart network interface card, power on demands from different smart network interface cards on the main board in different working states are satisfied accordingly, and different smart network interface cards can be further powered on. In addition, the main board performs the bifurcation on its own communication bandwidth according to the interface bandwidth information of the target smart network interface card, a bandwidth demand from the target smart network interface card is satisfied accordingly, the target smart network interface card can be further identified by the CPU in the main board, and then the target smart network interface card can operate an upper layer of service.

DETAILED DESCRIPTION OF THE EMBODIMENTS

Examples of the disclosure will be described in detail below with reference to accompanying drawings and in conjunction with the examples.

It should be noted that terms such as "first" and "second" in the description, the claims and the accompanying drawings of the disclosure are used to distinguish similar objects, rather than describe a specific sequence or a sequential order.

Figure 1:
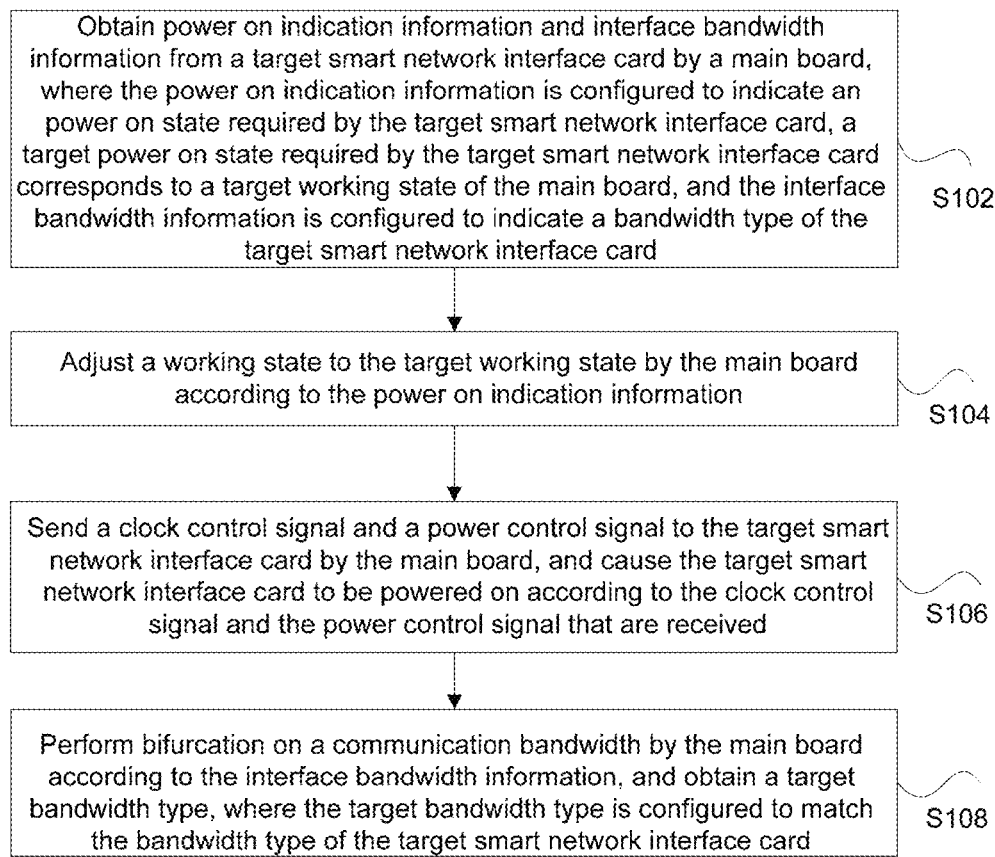
FIG. 1 is a flowchart of a method for powering on a smart network interface card according to an example of the disclosure.

This example provides a method for powering on a smart network interface card. FIG. 1 is a flowchart of a method for powering on a smart network interface card according to an example of the disclosure. As shown in FIG. 1, the flow includes:

S102. A main board obtains power on indication information and interface bandwidth information from a target smart network interface card, where the power on indication information is configured to indicate a target power on state required by the target smart network interface card, the target power on state required by the target smart network interface card corresponds to a target working state of the main board, and the interface bandwidth information is configured to indicate a bandwidth type of the target smart network interface card.

S104. The main board adjusts a working state to the target working state according to the power on indication information.

S106. The main board sends a clock control signal and a power control signal to the target smart network interface card, and the target smart network interface card is caused to be powered on according to the clock control signal and the power control signal that are received.

S108. The main board performs bifurcation on a communication bandwidth according to the interface bandwidth information, and a target bandwidth type is obtained, where the target bandwidth type is configured to match the bandwidth type of the target smart network interface card.

Through the steps described above, the main board can adjust its own working state according to the power on state required by the target smart network interface card, power on demands from different smart network interface cards on the main board in different working states are satisfied accordingly, and different smart network interface cards can be further powered on. In addition, the main board performs the bifurcation on its own communication bandwidth according to the interface bandwidth information of the target smart network interface card, a bandwidth demand from the target smart network interface card is satisfied accordingly, the target smart network interface card can be further identified by a central processing unit (CPU) in the main board, and then the target smart network interface card can operate an upper layer of service. Hence the problem that the same main board cannot satisfy power on demands from different smart network interface cards in the related art might be solved, and an effect of power on with one board matched with smart network interface cards from different manufacturers is achieved.

Moreover, through the steps described above, smart network interface cards that have various demands can be compatible and implemented in a complete server system. This solution has a low implementation cost, a simple hardware architecture, low maintenance and repair costs and high reliability. In addition, the method has high universality, is applicable to complete server systems of x86, advanced RISC machine (ARM), microprocessor without interlocked piped stages (MIPS) and other platforms, and has a high market value accordingly.

An execution order of S104 and S106 is interchangeable with an execution order of S108, that is, S108 can be executed before S104 and S106.

Figure 2:
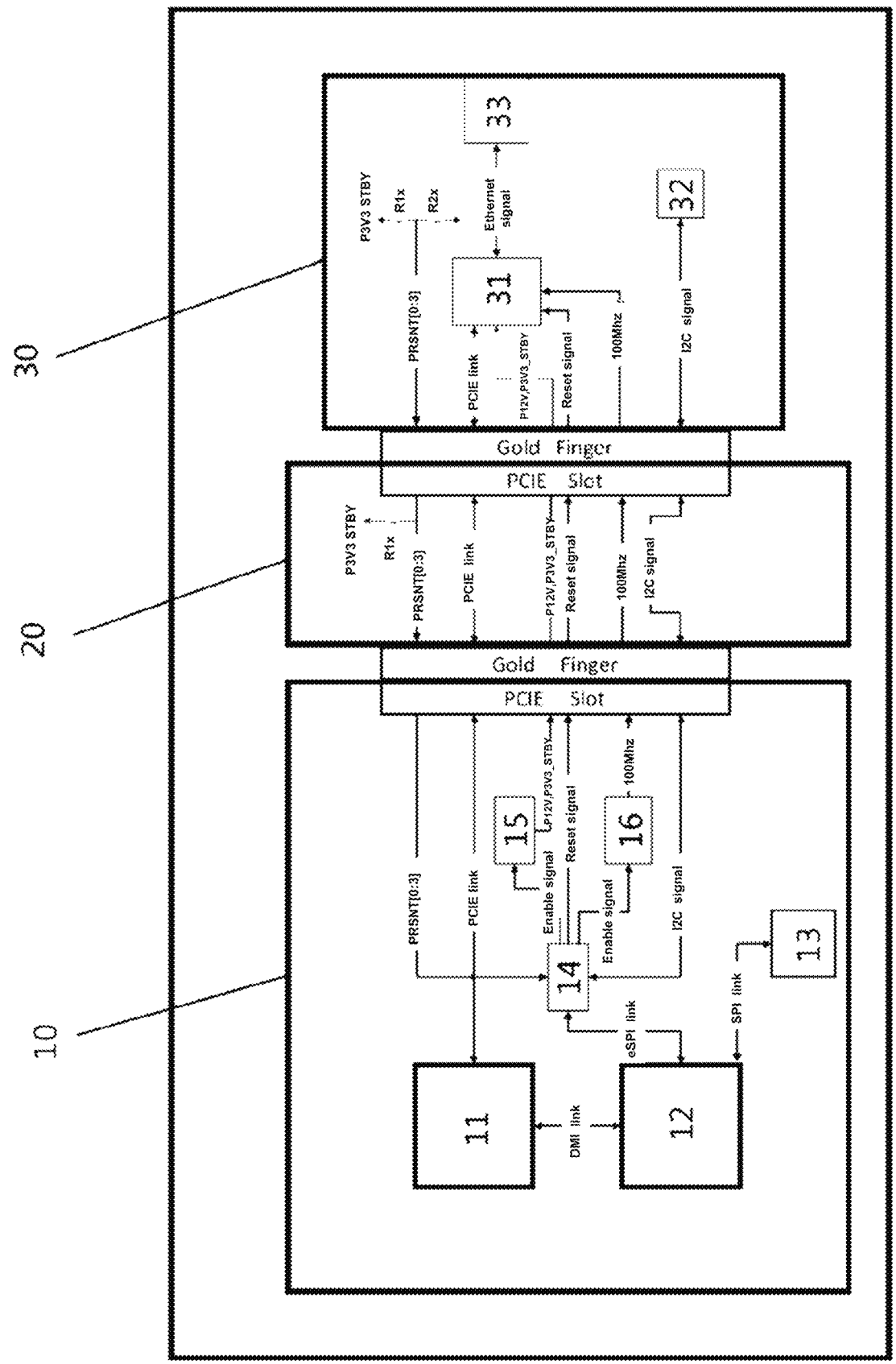
FIG. 2 is a power clock architecture diagram in a method for powering on a smart network interface card according to an example of the disclosure.

Illustratively, as shown in FIG. 2, a peripheral component interconnect express slot (PCIE slot) is provided in the main board 10. A gold finger on a riser board 20 is inserted into the PCIE slot on the main board for interconnection, a PCIE slot is further provided on the riser board, and a gold finger on the smart network interface card 30 is inserted into the riser board for interconnection. The main board may have a central processing unit (CPU) 11 and a platform controller hub (PCH) 12, and the CPU 11 and the PCH 12 may be interconnected through a direct media interface (DMI) link. The PCH 12 and a serial peripheral interface flash (SPI flash) 13 are connected through a serial peripheral interface (SPI) link, and basic input output system (BIOS) firmware is stored in the SPI flash 13. After being turned on, the BIOS firmware is loaded into the PCH 12 and then transmitted to a core of the CPU 11 through the DMI link for operation. A peripheral component interconnect express (PCIE) signal output by the CPU 11 on the main board is connected to the PCIE slot, then connected to the riser board, and finally connected to a main control chip 31 of the target smart network interface card 30 through the PCIE slot and the gold finger.

As shown in FIG. 2, the main board may include a field programmable gate array (FPGA) 14. In some embodiments, the step that the main board 10 obtains power on indication information from the target smart network interface card 30 includes: the FPGA 14 sends an obtainment request to the target smart network interface card 30 through an inter-integrated circuit (I2C) interface, and the target smart network interface card 30 is caused to respond to the obtainment request and send the power on indication information; and the FPGA 14 receives the power on indication information.

Exemplarily, as shown in FIG. 2, the smart network interface card 30 may have a field replaceable unit (FRU) 32. The FRU 32 stores information on whether a power signal, a clock signal and a reset signal are required, by the smart network interface card 30, to be provided for the smart network interface card 30 in an S5 state (device shutdown state) or in an S0 state (device active state), and the FPGA 14 in the main board 10 is connected to the riser board 20 through the I2C interface and then connected to the FRU 32 in the smart network interface card 30. Then the FPGA 14 is caused to send the obtainment request to the smart network interface card 30 through an I2C signal, and the smart network interface card 30 is caused to respond to the obtainment request and send power on indication information corresponding to the S5 state or the S0 state.

As shown in FIG. 2, the main board 10 may further include a voltage regulator chip (VR chip) 15 and a clock buffer 16. In some embodiments, the step that the main board 10 sends a clock control signal and a power control signal to the target smart network interface card 30 includes: the FPGA 14 sends an enable signal to the voltage regulator chip 15 and the clock buffer 16 according to the target working state; the clock buffer 16 sends the clock control signal to the target smart network interface card 30 according to the enable signal; and the voltage regulator chip 15 sends the power control signal to the target smart network interface card 30 according to the enable signal.

In the embodiment described above, the step that the FPGA sends an enable signal to the voltage regulator chip and the clock buffer according to the target working state may include: the FPGA determines whether the target working state is a first state, where the first state is an power on state or a power off state; the FPGA sends a first enable signal to the voltage regulator chip and the clock buffer under the condition a determination result indicates yes, the clock buffer sends a first clock control signal corresponding to the first state under the condition of receiving the first enable signal, and the voltage regulator chip sends a first power control signal corresponding to the first state under the condition of receiving the first enable signal. The target working state is determined as a second state and the FPGA sends a second enable signal to the voltage regulator chip and the clock buffer under the condition the determination result indicates no, the clock buffer sends a second clock control signal corresponding to the second state under the condition of receiving the second enable signal, and the voltage regulator chip sends a second power control signal corresponding to the second state under the condition of receiving the second enable signal, where the second state and the first state are the power on state and the power off state respectively. Exemplarily, as shown in FIG. 2, the FPGA 14 sends an enable signal to the voltage regulator chip 15 and the clock buffer 16 in the S5 state under the condition that the FPGA 14 knows from the power on indication information from the FRU 32 of the smart network interface card 30 that the power signal, the clock signal and the reset signal are required to be provided for the smart network interface card 30 in the S5 state. The voltage regulator chip 15 and the clock buffer 16 are caused to send the power signal (P12V, P3V3_STBY) and a 100 Mhz clock signal respectively, and same are transmitted to a main control chip 31 of the target smart network interface card (smart NIC) 30 through the riser board 20. Then the smart NIC 30 converts a PCIE signal into an Ethernet signal and transmits same to a small form-factor pluggable (SFP)+ interface 33, and the FPGA 14 may further send the reset signal to the smart NIC 30. Under the condition that the power on indication information indicates that the power signal, the clock signal and the reset signal are required to be provided for the smart network interface card 30 in the S0 state of the main board 10, the FPGA 14 performs the operation in the S0 state.

Moreover, in the prior art, an ID[0:n] signal in the riser board is pulled up to a direct current voltage of 3.3 v (P3V3_STBY) through a resistor Rix or pulled down to a ground terminal GND through a resistor $R_2x$, and a number of ID[0:n] signals may be determined according to a specific demand, for example, merely one signal line or a plurality of signal lines may be provided. Numbers of Rix and $R_2x$ change accordingly according to the number of ID[0:n] signals, a series of binary numerical values are generated finally according to permutation and combination of ID[0:n], and the value of ID[0:n] is provided for the FPGA in the main board. According to the value of ID[0:n], the FPGA determines whether the smart network interface card requires the main board to provide the power signal, the clock signal and the reset signal in the S5 state (device shutdown state) or S0 state (device active state), and then the FPGA determines whether a current complete system is in the S5 or S0 state according to its own internal power state, and finally sends the signal to the voltage regulator chip and the clock buffer according to the values of ID[0:n].

However, in the prior art, two or more riser boards are required to be developed and the ID[0:n] on the riser board are pulled up or pulled down, so as to determine whether a smart network interface card that requires the power signal, the clock signal and the reset signal to be provided in the S5 state or a smart network interface card that requires the power signal, the clock signal and the reset signal to be provided in the S0 state is to be mounted on the riser board.

Compared with the prior art, this example can satisfy, with merely one set of main board and riser board, demands from different smart network interface cards that the main board provides the clock signal, the power signal and the reset signal in the S5 state or the S0 state.

In some embodiments, the step that a main board obtains interface bandwidth information from a target smart network interface card includes: by the FPGA receives an indication signal from a second interface of a riser board through a first interface, and the riser board is caused to forward the indication signal from the target smart network interface card, where the first interface and the riser board are interconnected, the first interface has the same bandwidth as the communication bandwidth, the riser board and the target smart network interface card are interconnected through the second interface, and a numerical value of the indication signal is configured to indicate the bandwidth type of the target smart network interface card.

The bandwidth type may refer to different types and numbers of PCIE slots. For example, the bandwidth types may include: 1 x16 slot, 2 x8 slots, 4 x4 slots, 8 x2 slots and 16 x1 slots. And x1 slot has a minimum bandwidth and x16 slot has a maximum bandwidth.

Exemplarily, as shown in FIG. 2, the FPGA 14 in the main board 10 receives the indication signal sent by the smart network interface card 30. The indication signal may have signal values of different magnitudes according to the different bandwidths of the smart network interface card 30. Illustratively, the indication signal sent is a PRSNT[0:3] signal. If a smart network interface card that has a PCIE x8 bandwidth is inserted into the riser board 20, a value of the PRSNT[0:3] is 0100. If a smart network interface card that has a PCIE x16 bandwidth is inserted, a value of PRSNT [0:3] is 0001. If a customized network interface card is inserted, bifurcation may be needed to be performed on x16 to obtain 4 x4 bandwidths or 2 x8 PCIE bandwidths, and values of PRSNT[0:3] are 0101 or 1111 correspondingly.

The main board may further include a platform controller hub (PCH). In some embodiments, the steps that the main board performs bifurcation on a output bandwidth according to the interface bandwidth information, and a target bandwidth type is obtained include: the FPGA sends the indication signal to the platform controller hub; the platform controller hub performs bifurcation on the communication bandwidth through a basic input output system according to the numerical value of the indication signal, and the first interface is caused to have the target bandwidth type; and a central processing unit identifies the target smart network interface card under the condition that the target bandwidth type is the same as the bandwidth type of the target smart network interface card, and the target smart network interface card is matched under the condition that the CPU identifies the target smart network interface card.

Illustratively, as shown in FIG. 2, an enhanced serial peripheral interface (eSPI) link may be added between the PCH 12 and the FPGA 14. This link mainly plays a role in transmitting a signal value to the PCH 12 after the FPGA 14 obtains the signal value of the indication signal of the smart network interface card 30, and the BIOS is caused to perform bifurcation on an uplink PCIE x16 according to an actual bandwidth of the smart network interface card 30 during an PCIE initialization process, thus satisfying the bandwidth demand from the smart network interface card 30. The CPU 11 identifies the smart network interface card 30, and the smart network interface card 30 is matched under the condition that the CPU 11 identifies the smart network interface card 30.

Figure 3:
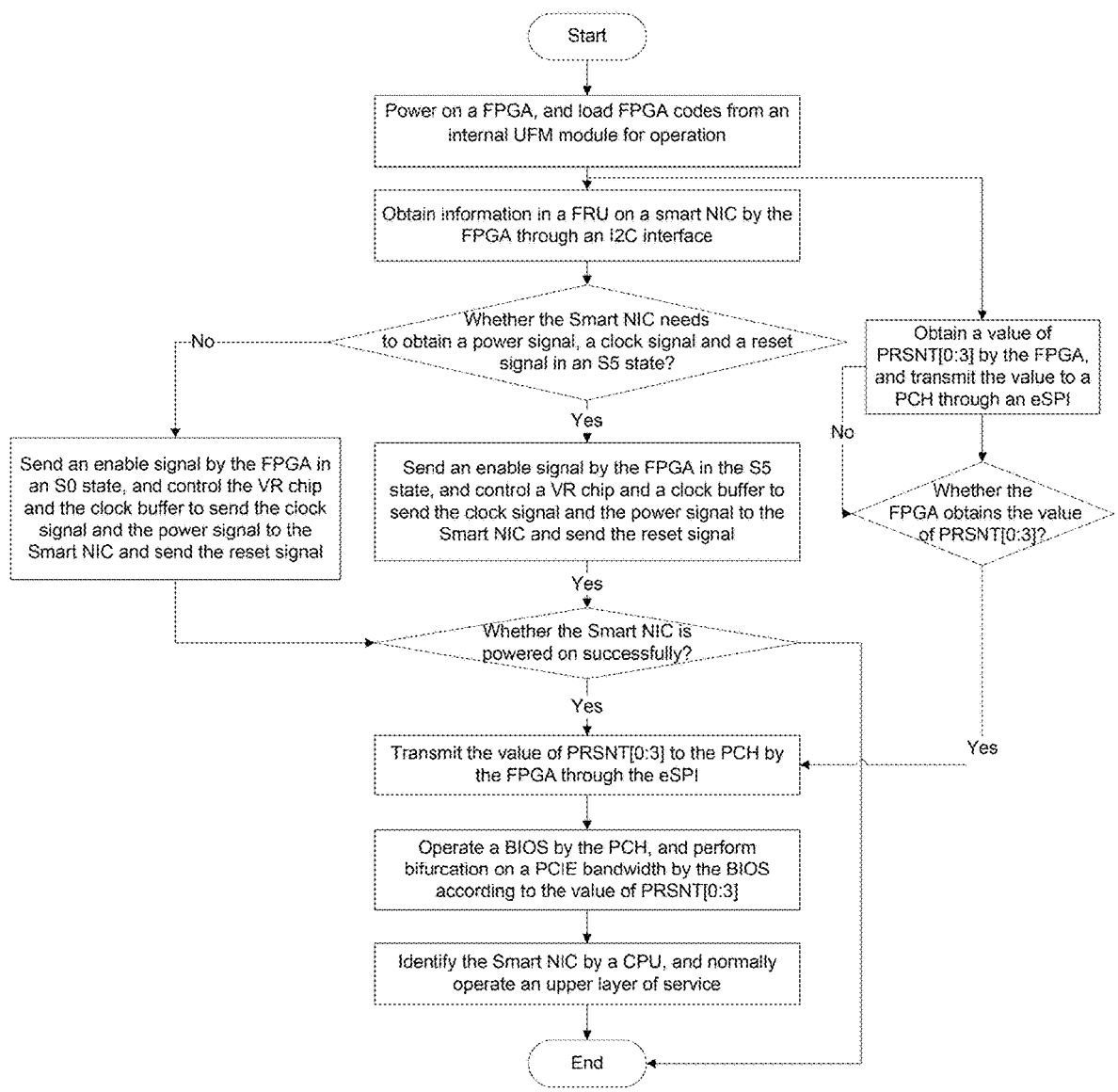
FIG. 3 is a flowchart of field programmable gate array (FPGA) codes in a method for powering on a smart network interface card according to an example of the disclosure.

FIG. 3 shows a flowchart of a specific instance of the method according to the disclosure. The example of the disclosure will be described below with reference to FIG. 3. The flowchart includes:

After an FPGA is powered on, the FPGA loads FPGA codes from an internal unified flow management (UFM) module for operation, then the FPGA obtains power on indication information from an FRU on a target smart network interface card (smart NIC) through an I2C interface, and the FPGA further obtains a value of a PRSNT[0:3] signal from the target smart network interface card.

The FPGA sends an enable signal to a voltage regulator chip and a clock buffer in an S5 state under the condition that the FPGA knows from the information from the FRU that a power signal, a clock signal and a reset signal are required, by the target smart network interface card, to be provided for the smart network interface card in the S5 state. The voltage regulator chip and the clock buffer are caused to send the power signal and the clock signal respectively, and the signals are transmitted to a main control chip of the target smart network interface card (smart NIC) through a riser board. The FPGA further sends the reset signal, and the signal is also transmitted to the main control chip of the target smart network interface card through the riser board.

Under the condition that the power on indication information indicates that the power signal, the clock signal and the reset signal are required to be provided for the target smart network interface card in an S0 state of the main board, the FPGA performs the operation in the S0 state.

The target smart network interface card is powered on successfully, and the FPGA also obtains the value of the PRSNT[0:3] signal, and transmits the signal value to the PCH through an eSPI bus; otherwise, the target smart network interface card is not powered on successfully, and the flow ends.

The PCH operates a BIOS, and the BIOS performs bifurcation on a PCIE bandwidth according to the signal value of PRSNT[0:3].

Based on this, the power, clock, reset, and bandwidth bifurcation of the target smart network interface card are all satisfied, and the target smart network interface card can be identified by an uplink CPU, so as to operate an upper layer of service.

Figure 4:
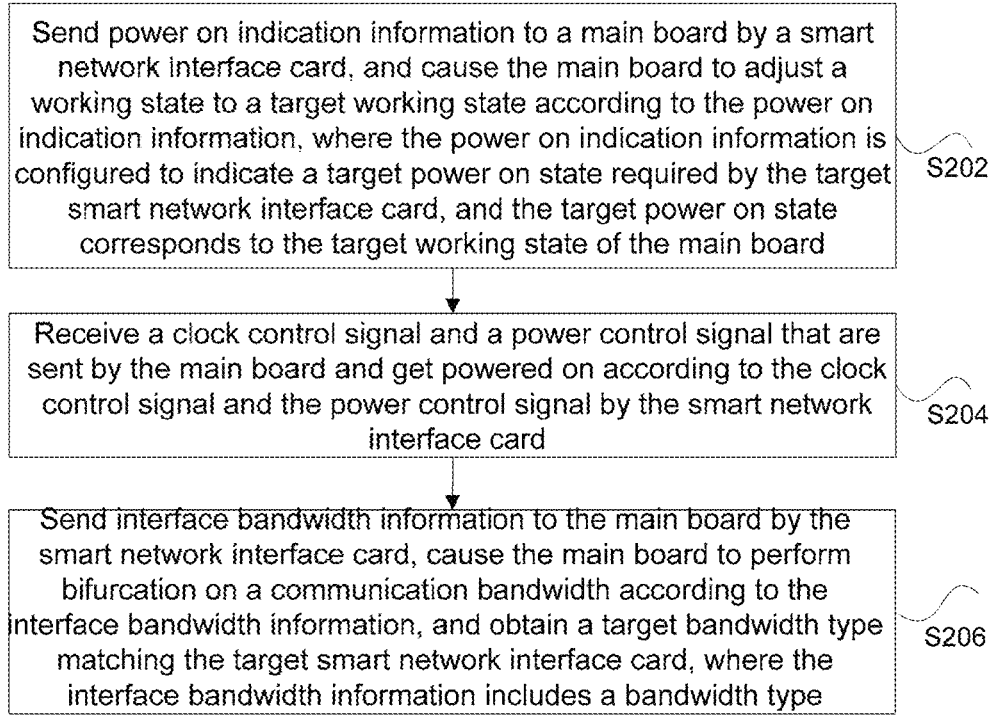
FIG. 4 is a flowchart of another method for powering on a smart network interface card according to an example of the disclosure.

This example provides another method for powering on a smart network interface card. FIG. 4 is a flowchart of a method for powering on a smart network interface card according to an example of the disclosure. As shown in FIG. 4, the flow includes:

S202. A smart network interface card sends power on indication information to a main board, and the main board is caused to adjust a working state to a target working state according to the power on indication information, where the power on indication information is configured to indicate a target power on state required by the target smart network interface card, and the target power on state corresponds to the target working state of the main board.

S204. The target smart network interface card receives a clock control signal and a power control signal that are sent by the main board and gets powered on according to the clock control signal and the power control signal.

S206. The target smart network interface card sends interface bandwidth information to the main board, the main board is caused to perform bifurcation on a communication bandwidth according to the interface bandwidth information, and a target bandwidth type matching the target smart network interface card is obtained, where the interface bandwidth information includes a bandwidth type.

Through the steps described above, the target smart network interface card can indicate the power on state required by sending the power on indication information to the main board, the main board is caused to adjust its own working state, power on demands from different smart network interface cards on the main board in different working states are satisfied accordingly, and different smart network interface cards can be further powered on. In addition, the target smart network interface card may send the interface bandwidth information to the main board, the main board is caused to perform the bifurcation on its own communication bandwidth according to the interface bandwidth information, a bandwidth demand from the target smart network interface card is satisfied accordingly, the target smart network interface card can be further identified by the CPU in the main board, and then the target smart network interface card can operate an upper layer of service. Hence the problem that the same main board cannot satisfy power on demands from different smart network interface cards in the related art might be solved, and an effect of power on with one board matched with smart network interface cards from different manufacturers is achieved.

The target smart network interface card may include a field replaceable unit. In some optional embodiments, the step that a target smart network interface card sends power on indication information to a main board includes: the field replaceable unit receives an obtainment request from the main board through an I2C interface; and the field replaceable unit sends the power on indication information under the condition of receiving the obtainment request.

In the embodiment, the target smart network interface card may further receive a reset signal from the main board.

Exemplarily, the FRU stores information on whether a power signal, a clock signal and a reset signal are required, by the smart network interface card, to be provided for the smart network interface card in an S5 state (device shutdown state) or in an S0 state (device active state), and an FPGA in the main board is connected to a riser board through the I2C interface and then connected to the FRU in the smart network interface card. Then the FPGA is caused to send the obtainment request to the smart network interface card through the I2C signal, and the smart network interface card is caused to respond to the obtainment request and send the power on indication information corresponding to the S5 state or the S0 state. The FPGA sends an enable signal to a voltage regulator chip and a clock buffer in an S5 state (or an S0 state) under the condition that the FPGA knows from the power on indication information sent from the FRU that the power signal, the clock signal and the reset signal are required to be provided for the smart network interface card in the S5 state (or the S0 state). The voltage regulator chip and the clock buffer are caused to send the power signal and the clock signal to the smart network interface card. The FPGA further sends the reset signal to the smart network interface card.

In some embodiments, the step that the target smart network interface card sends interface bandwidth information to the main board includes: the target smart network interface card sends an indication signal to a riser board, and the riser board is caused to forward the indication signal to the main board, where a numerical value of the indication signal is configured to indicate the bandwidth type.

Exemplarily, the smart network interface card sends the indication signal to the FPGA in the main board. The indication signal may have signal values of different sizes according to the different bandwidths of the smart network interface card. Illustratively, the indication signal sent is a PRSNT[0:3] signal. If a smart network interface card that has a PCIE x8 bandwidth is inserted into the riser board, a value of the PRSNT[0:3] is 0100. If a smart network interface card that has a PCIE x16 bandwidth is inserted, a value of PRSNT[0:3] is 0001. If a customized network interface card is inserted, bifurcation may be needed to be performed on x16 to obtain 4 x4 bandwidths or 2 x8 PCIE bandwidths, and values of PRSNT[0:3] are 0101 or 1111 correspondingly. In this way, after the FPGA obtains the signal value of the indication signal from the smart network interface card, bifurcation is performed on the uplink PCIE x16 correspondingly, the bandwidth demand from the smart network interface card is satisfied, the CPU identifies the target smart network interface card, and the target smart network interface card is matched.

Figure 5:
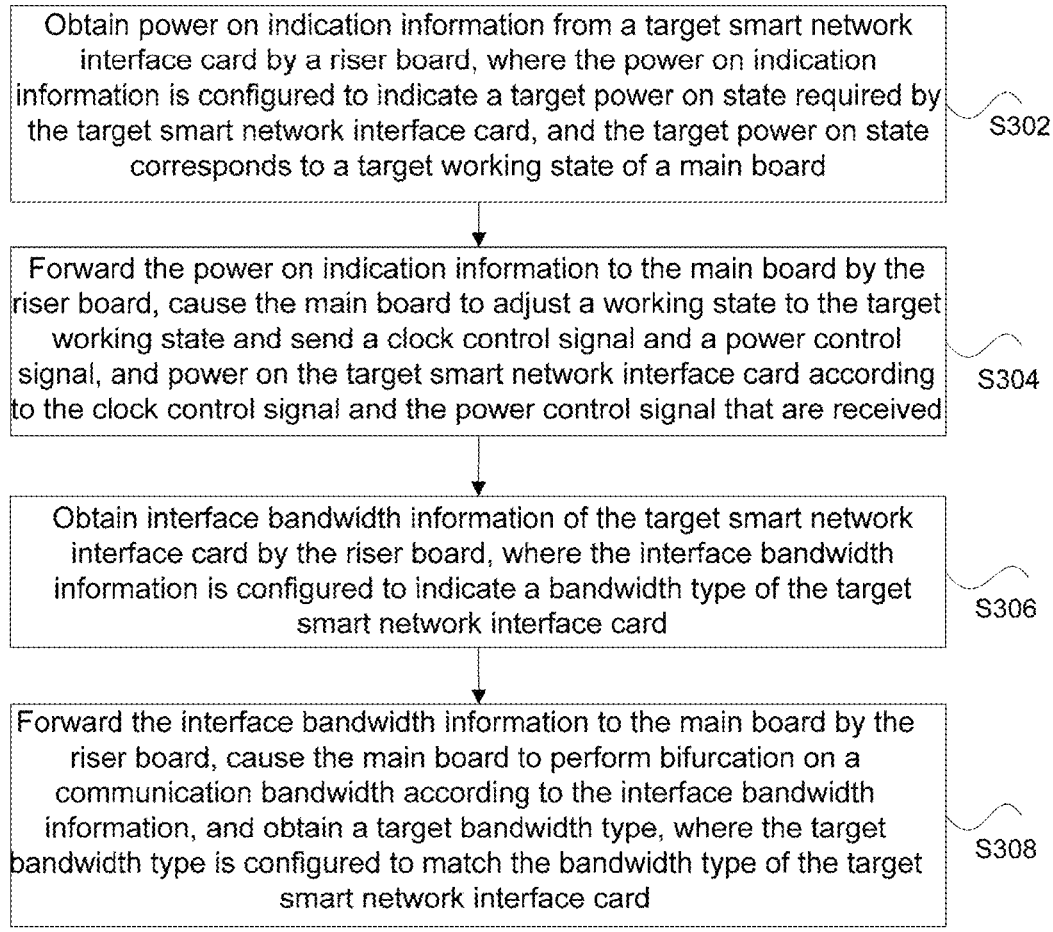
FIG. 5 is a flowchart of yet another method for powering on a smart network interface card according to an example of the disclosure.

This example provides yet another method for powering on a smart network interface card. FIG. 5 is a flowchart of a method for powering on a smart network interface card according to an example of the disclosure. As shown in FIG. 5, the flow includes:

S302. A riser board obtains power on indication information from a target smart network interface card, where the power on indication information is configured to indicate a target power on state required by the target smart network interface card, and the target power on state corresponds to a target working state of a main board.

S304. The riser board forwards the power on indication information to the main board, the main board is caused to adjust a working state to the target working state and send a clock control signal and a power control signal, and the target smart network interface card is powered on according to the clock control signal and the power control signal that are received.

S306. The riser board obtains interface bandwidth information of the target smart network interface card, where the interface bandwidth information is configured to indicate a bandwidth type of the target smart network interface card.

S308. The riser board forwards the interface bandwidth information to the main board, the main board is caused to perform bifurcation on a communication bandwidth according to the interface bandwidth information, and a target bandwidth type is obtained, where the target bandwidth type is configured to match the bandwidth type of the target smart network interface card.

Through the steps described above, the power on indication information from the smart network interface card can be forwarded to the main board through the riser board to indicate an power on state required, the main board is caused to adjust its own working state, power on demands from different smart network interface cards on the main board in different working states are satisfied accordingly, and different smart network interface cards can be further powered on. In addition, the riser board can further forward the interface bandwidth information of the target smart network interface card to the main board, the main board is caused to perform bifurcation on its own communication bandwidth according to the interface bandwidth information, a bandwidth demand from the target smart network interface card is satisfied accordingly, the target smart network interface card can be further identified by the CPU in the main board, and then the target smart network interface card can operate an upper layer of service. Hence the problem that the same main board cannot satisfy power on demands from different smart network interface cards in the related art might be solved, and an effect of power on with one board matched with smart network interface cards from different manufacturers is achieved.

The method of the disclosure will be described below in conjunction with specific instances. The method includes:

After the FPGA is powered on, the riser board forwards the power on indication information from the target smart network interface card to the FPGA through an I2C, and further forwards the PRSNT[0:3] signal from the target smart network interface card to the FPGA. The FPGA is caused to know from the information from the FRU that the power signal, the clock signal and the reset signal are required, by the smart network interface card, to be provided for the smart network interface card in the S5 state or the S0 state, and sends an enable signal to a voltage regulator chip and a clock buffer as required. The voltage regulator chip and the clock buffer send the power signal and the clock signal to the smart network interface card. The FPGA further sends the reset signal to the smart network interface card.

After the target smart network interface card is powered on successfully, the FPGA also obtains the PRSNT[0:3] signal forwarded by the riser board, the signal value is obtained through parsing, and bifurcation is performed on the PCIE bandwidth according to the signal value of the PRSNT[0:3]. Thus the bandwidth demand from the smart network interface card is satisfied, the CPU is caused to identify the target smart network interface card, and the target smart network interface card is matched under the condition that the CPU identifies the target smart network interface card.

It can be clearly understood by those skilled in the art from the description of the embodiment that the method according to the example can be implemented by means of software and necessary general hardware platforms, and can be certainly implemented through the hardware, of which the former is a preferred embodiment in many cases. Based on such understanding, the technical solution in essence of the disclosure or the part that contributes to the prior art may be embodied in the form of software products, the computer software products are stored in the storage medium (such as a read-only memory/a random access memory (ROM/RAM), a diskette and an optical disk), and include several instructions to make a terminal device (which may be a mobile phone, a computer, a server, a network device, etc.) execute the method of each example of the disclosure. In this example, an apparatus for powering on a smart network interface card is further provided, the apparatus is configured to implement the above example and the preferred embodiment, and details which are described above will not be repeated herein. As used below, the term "module" may be a combination of software and/or hardware that performs a predetermined function. Although the apparatuses described in the following examples are preferably implemented through software, implementation through hardware, or the combination of software and hardware is probable and conceivable.

Figure 6:
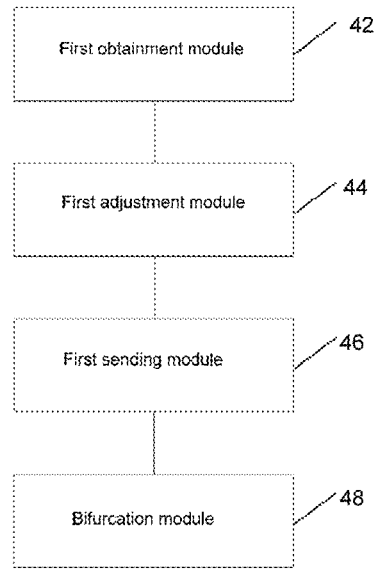
FIG. 6 is a structural block diagram of an apparatus for powering on a smart network interface card according to an example of the disclosure.

FIG. 6 is a structural block diagram of an apparatus for powering on a smart network interface card according to an example of the disclosure. As shown in FIG. 6, the apparatus includes:

a first obtainment module 42 configured to obtain power on indication information and interface bandwidth information from a target smart network interface card, where the power on indication information is configured to indicate an power on state required by the target smart network interface card, a target power on state required by the target smart network interface card corresponds to a target working state of the main board, and the interface bandwidth information is configured to indicate a bandwidth type of the target smart network interface card;

a first adjustment module 44 configured to adjust a working state to the target working state by using the main board according to the power on indication information;

a first sending module 46 configured to send a clock control signal and a power control signal to the target smart network interface card by using the main board, and cause the target smart network interface card to be powered on according to the clock control signal and the power control signal that are received; and a bifurcation module 48 configured to perform bifurcation on a communication bandwidth by using the main board according to the interface bandwidth information, and obtain a target bandwidth type, where the target bandwidth type is configured to match the bandwidth type of the target smart network interface card.

Through the modules described above, the first obtainment module 42, the first adjustment module 44 and the first sending module 46 may cause the main board to adjust its own working state according to the power on state required by the target smart network interface card, power on demands from different target smart network interface cards on the main board in different working states are satisfied accordingly, and different smart network interface cards can be further powered on. In addition, the bifurcation module 48 may cause the main board to perform the bifurcation on its own communication bandwidth according to the interface bandwidth information of the target smart network interface card, a bandwidth demand from the target smart network interface card is satisfied accordingly, the target smart network interface card can be further identified by the CPU in the main board, and then the target smart network interface card can operate an upper layer of service. Hence the problem that the same main board cannot satisfy power on demands from different smart network interface cards in the related art might be solved, and an effect of power on with one board matched with smart network interface cards from different manufacturers is achieved.

In some embodiments, the main board includes an FPGA. The first obtainment module 42 includes: a first sending sub-module configured to send an obtainment request to the target smart network interface card through an I2C interface by using the FPGA, and cause the target smart network interface card to respond to the obtainment request and send the power on indication information; and a first reception sub-module configured to receive the power on indication information by using the FPGA.

In some embodiments, the main board further includes a voltage regulator chip and a clock buffer. The first sending module 46 includes: a second sending sub-module configured to send an enable signal to the voltage regulator chip and the clock buffer by using the FPGA according to the target working state; a third sending sub-module configured to send the clock control signal to the target smart network interface card by using the clock buffer according to the enable signal; and a fourth sending sub-module configured to send the power control signal to the target smart network interface card by using the voltage regulator chip according to the enable signal.

In some embodiments, the second sending sub-module includes: a determination sub-module configured to determine whether the target working state is a first state by using the FPGA, where the first state is an power on state or a power off state; a fifth sending sub-module configured to send a first enable signal to the voltage regulator chip and the clock buffer by using the FPGA under the condition a determination result indicates yes, send a first clock control signal corresponding to the first state by the clock buffer under the condition of receiving the first enable signal, and send a first power control signal corresponding to the first state by the voltage regulator chip under the condition of receiving the first enable signal; and a sixth sending sub-module configured to determine the target working state as a second state and send a second enable signal to the voltage regulator chip and the clock buffer by using the FPGA under the condition a determination result indicates no, send a second clock control signal corresponding to the second state by the clock buffer under the condition of receiving the second enable signal, and send a second power control signal corresponding to the second state by the voltage regulator chip under the condition of receiving the second enable signal, where the second state and the first state are the power on state and the power off state respectively.

In some embodiments, the first sending module 46 further includes: a seventh sending sub-module configured to send a reset signal to the target smart network interface card by using the FPGA.

In some embodiments, the first obtainment module 42 further includes: a second reception sub-module configured to receive an indication signal from a second interface of a riser board by using the FPGA through a first interface, and cause the riser board to forward the indication signal from the target smart network interface card, where the first interface and the riser board are interconnected, the first interface has the same bandwidth as the communication bandwidth, the riser board and the target smart network interface card are interconnected through the second interface, and a numerical value of the indication signal is configured to indicate the bandwidth type of the target smart network interface card.

In some embodiments, the main board further includes a platform controller hub. The bifurcation module 48 includes: an eighth sending sub-module configured to send the indication signal to the platform controller hub by using the FPGA; a bifurcation sub-module configured to perform bifurcation on the communication bandwidth by using the platform controller hub through a basic input output system according to the numerical value of the indication signal, and cause the first interface to have the target bandwidth type; and an identification module configured to identify the target smart network interface card by using a CPU under the condition that the target bandwidth type is the same as the bandwidth type of the target smart network interface card, and match the target smart network interface card with the CPU under the condition that the CPU identifies the target smart network interface card.

Figure 7:
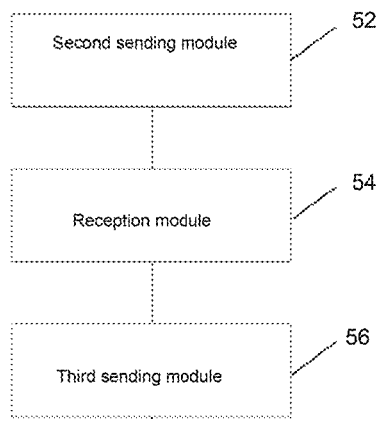
FIG. 7 is a structural block diagram of another apparatus for powering on a smart network interface card according to an example of the disclosure.

This example provides another apparatus for powering on a smart network interface card. FIG. 7 is a structural block diagram of an apparatus for powering on a smart network interface card according to an example of the disclosure. As shown in FIG. 7, the apparatus includes:

a second sending module 52 configured to send power on indication information to a main board by a smart network interface card, and cause the main board to adjust a working state to a target working state according to the power on indication information, where the power on indication information is configured to indicate a target power on state required by the target smart network interface card, and the target power on state corresponds to the target working state of the main board;

a reception module 54 configured to receive a clock control signal and a power control signal that are sent by the main board and get powered on according to the clock control signal and the power control signal by using the smart network interface card; and a third sending module 56 configured to send interface bandwidth information to the main board by using the smart network interface card, cause the main board to perform bifurcation on a communication bandwidth according to the interface bandwidth information, and obtain a target bandwidth type matching the target smart network interface card, where the interface bandwidth information includes a bandwidth type.

Through the modules described above, the second sending module 52 and the reception module 54 may cause the target smart network interface card to indicate the power on state required by sending the power on indication information to the main board, the main board is caused to adjust its own working state, power on demands from different smart network interface cards on the main board in different working states are satisfied accordingly, and different smart network interface cards can be further powered on. In addition, the third sending module 56 may cause the target smart network interface card to send the interface bandwidth information to the main board, the main board is caused to perform the bifurcation on its own communication bandwidth according to the interface bandwidth information, a bandwidth demand from the target smart network interface card is satisfied accordingly, the target smart network interface card can be further identified by the CPU in the main board, and then the target smart network interface card can operate an upper layer of service. Hence the problem that the same main board cannot satisfy power on demands from different smart network interface cards in the related art might be solved, and an effect of power on with one board matched with smart network interface cards from different manufacturers is achieved.

In some embodiments, the smart network interface card includes a field replaceable unit. The second sending module 52 includes: a third reception sub-module configured to receive an obtainment request from the main board by using the field replaceable unit through an I2C interface; and a ninth sending sub-module configured to send the power on indication information by using the field replaceable unit under the condition of receiving the obtainment request.

In some embodiments, the third sending module 56 includes: a tenth sending sub-module configured to send an indication signal to a riser board by using the smart network interface card, and cause the riser board to forward the indication signal to the main board, where a numerical value of the indication signal is configured to indicate the bandwidth type.

In some embodiments, the apparatus further includes: a fourth reception sub-module configured to receive a reset signal from the main board by using the smart network interface card.

Figure 8:
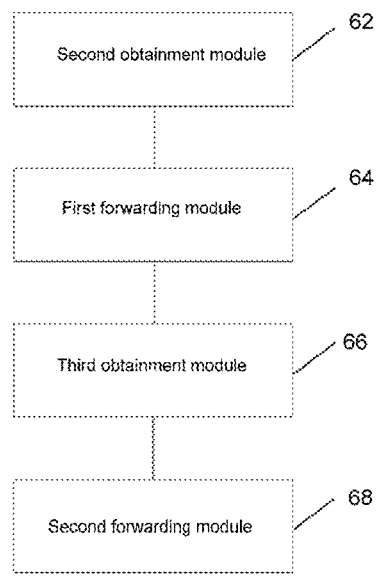
FIG. 8 is a structural block diagram of yet another apparatus for powering on a smart network interface card according to an example of the disclosure.

This example provides yet another apparatus for powering on a smart network interface card. FIG. 8 is a structural block diagram of an apparatus for powering on a smart network interface card according to an example of the disclosure. As shown in FIG. 8, the apparatus includes:

a second obtainment module 62 configured to obtain power on indication information from a target smart network interface card by using a riser board, where the power on indication information is configured to indicate a target power on state required by the target smart network interface card, and the target power on state corresponds to a target working state of a main board;

a first forwarding module 64 configured to forward the power on indication information to the main board by using the riser board, cause the main board to adjust a working state to the target working state and send a clock control signal and a power control signal, and energize the target smart network interface card according to the clock control signal and the power control signal that are received;

a third obtainment module 66 configured to obtain interface bandwidth information of the target smart network interface card by using the riser board, where the interface bandwidth information is configured to indicate a bandwidth type of the target smart network interface card; and a second forwarding module 68 configured to forward the interface bandwidth information to the main board by using the riser board, cause the main board to perform bifurcation on a communication bandwidth according to the interface bandwidth information, and obtain a target bandwidth type, where the target bandwidth type is configured to match the bandwidth type of the target smart network interface card.

Through the modules described above, the second obtainment module 62 and the first forwarding module 64 may cause the riser board to forward power on indication information from the smart network interface card to the main board to indicate an power on state required, the main board is caused to adjust its own working state, power on demands from different target smart network interface cards on the main board in different working states are satisfied accordingly, and different smart network interface cards can be further powered on. In addition, the third obtainment module 66 and the second forwarding module 68 may cause the riser board to further forward the interface bandwidth information of the target smart network interface card to the main board, the main board is caused to perform bifurcation on its own communication bandwidth according to the interface bandwidth information, a bandwidth demand from the target smart network interface card is satisfied accordingly, the target smart network interface card can be further identified by the CPU in the main board, and then the target smart network interface card can operate an upper layer of service. Hence the problem that the same main board cannot satisfy power on demands from different smart network interface cards in the related art might be solved, and an effect of power on with one board matched with smart network interface cards from different manufacturers is achieved.

It should be noted that the above modules may be implemented by software or hardware. In the latter case, the above modules are all located in the same processor; or, the above modules are separately located in different processors in any combination, which is non-limitative.

According to the example of the disclosure, a computer-readable nonvolatile storage medium is further provided. The computer-readable nonvolatile storage medium stores a computer program, where the computer program is configured to execute steps of any method example described above when running.

In an illustrative example, the computer-readable nonvolatile storage medium described above may include, but is not limited to, a USB flash drive, a read-only memory (ROM), a random access memory (RAM), a mobile hard disk drive, a diskette or optical disk that may store the computer program.

According to the example of the disclosure, an electronic device is further provided. The electronic apparatus includes a memory and a processor, where the memory stores a computer program, and the processor is configured to execute steps of any method example described above by running the computer program.

In an illustrative example, the electronic device may further include a transmission device and an input and output device, where the transmission device is connected to the processor described above, and the input and output device is connected to the processor described above.

Reference can be made to instances described in the examples and illustrative embodiments described above for specific instances in this example, which will not be repeated in this example.

Apparently, a person skilled in the art should understand that the modules or steps described above of the disclosure can be implemented by a general-purpose computation apparatus, can be centralized on a single computation apparatus or distributed over a network formed by a plurality of computation apparatuses, and can be implemented through program codes executable by the computation apparatus. Thus the modules or steps can be stored in a storage apparatus and executed by the computation apparatus, and in some cases, the steps shown or described can be executed in a sequence different from a sequence described herein, or the steps can be separately made into integrated circuit modules, or a plurality of modules or steps among the steps can be made into a singe integrated circuit module to be implemented. In this way, the disclosure is not limited to any specific hardware and software combination.

The examples described above are merely preferred examples of the disclosure and are not intended to limit the disclosure, and for those skilled in the art, various modifications and changes can be made to the disclosure. Any modification, equivalent substitution, improvement, etc. made according to principles of the disclosure should fall within the protection scope of the disclosure.

What is claimed is:

1. A method for powering on a smart Network Interface Card (NIC), comprising:
    obtaining, by a main board, power on indication information and interface bandwidth information from a target smart NIC, wherein the power on indication information is configured to indicate a target power on state required by the target smart NIC, the target power on state required by the target smart NIC corresponds to a target working state of the main board, and the interface bandwidth information is configured to indicate a bandwidth type of the target smart NIC;
    adjusting, by the main board, a working state to the target working state according to the power on indication information;
    sending, by the main board, a clock control signal and a power control signal to the target smart NIC, and causing the target smart NIC to be powered on according to the clock control signal and the power control signal that are received; and
    performing, by the main board, bifurcation on a communication bandwidth according to the interface bandwidth information, and obtaining a target bandwidth type, wherein the target bandwidth type is configured to match the bandwidth type of the target smart NIC;
    wherein the main board comprises a Field Programmable Gate Array (FPGA), and the obtaining, by a main board, power on indication information from a target smart NIC comprises:
    sending, by the FPGA, an obtainment request to the target smart NIC through an Inter-Integrated Circuit (I2C) interface, and causing the target smart NIC to respond to the obtainment request and send the power on indication information; and
    receiving, by the FPGA, the power on indication information.

2. The method as claimed in claim 1, wherein the main board further comprises a voltage regulator chip and a clock buffer, and the sending, by the main board, a clock control signal and a power control signal to the target smart NIC comprises:
    sending, by the FPGA, an enable signal to the voltage regulator chip and the clock buffer according to the target working state;
    sending, by the clock buffer, the clock control signal to the target smart NIC according to the enable signal; and sending, by the voltage regulator chip, the power control signal to the target smart NIC according to the enable signal.

3. The method as claimed in claim 2, wherein the sending, by the FPGA, an enable signal to the voltage regulator chip and the clock buffer according to the target working state comprises:
determining, by the FPGA, whether the target working state is a first state, wherein the first state is an power on state or a power off state;
sending, by the FPGA, a first enable signal to the voltage regulator chip and the clock buffer under a condition that a determination result indicates that the target working state is the first state, the clock buffer configured to send a first clock control signal corresponding to the first state under the condition of receiving the first enable signal, and the voltage regulator chip configured to send a first power control signal corresponding to the first state under the condition of receiving the first enable signal; and
determining, by the FPGA, the target working state as a second state and sending a second enable signal to the voltage regulator chip and the clock buffer under a condition that the determination result indicates that the target working state is not the first state, the clock buffer configured to send a second clock control signal corresponding to the second state under the condition of receiving the second enable signal, and the voltage regulator chip configured to send a second power control signal corresponding to the second state under the condition of receiving the second enable signal, wherein the second state and the first state are the power on state and the power off state respectively.

4. The method as claimed in claim 2, wherein the sending, by the main board, a clock control signal and a power control signal to the target smart NIC further comprises:
with sending by the FPGA, a reset signal to the target smart NIC.

5. The method as claimed in claim 1, wherein the obtaining, by a main board, interface bandwidth information from a target smart NIC comprises:
receiving, by the FPGA, an indication signal from a second interface of a riser board through a first interface, and causing the riser board to forward the indication signal from the target smart NIC, wherein the first interface and the riser board are interconnected, the first interface has the same bandwidth as the communication bandwidth, the riser board and the target smart NIC are interconnected through the second interface, and a numerical value of the indication signal is configured to indicate the bandwidth type of the target smart NIC.

6. The method as claimed in claim 5, wherein the main board further comprises a Platform Controller Hub (PCH), and the performing bifurcation on a output bandwidth by the main board according to the interface bandwidth information, and obtaining a target bandwidth type comprise:
sending, by the FPGA, the indication signal to the PCH;
performing, by the PCH, the bifurcation on the communication bandwidth through a basic input output system according to the numerical value of the indication signal, and causing the first interface to have the target bandwidth type; and
identifying, by a Central Processing Unit (CPU), the target smart NIC under a condition that the target bandwidth type is the same as a bandwidth type of the target smart NIC, and completing matching the target smart NIC with the CPU under a condition that the CPU identifies the target smart NIC.

7. The method as claimed in claim 5, wherein a first Peripheral Component Interconnect Express (PCIE) slot is provided in the main board, a first gold finger on the riser board is inserted into the first PCIE slot on the main board for interconnection, a second PCIE slot is further provided arranged in the riser board, and a second gold finger on the target smart NIC is inserted into the riser board for interconnection.

8. The method as claimed in claim 7, wherein the main board has a CPU and a PCH, and the CPU and the PCH are interconnected through a Direct Media Interface (DMI) link; the PCH is connected to a serial peripheral interface flash through a Serial Peripheral Interface (SPI) link, and Basic Input Output System (BIOS) firmware is stored in the flash; and after being turned on, the BIOS firmware is loaded into the PCH and then transmitted to a core of the CPU through the DMI link for operation.

9. The method as claimed in claim 8, wherein a PCIE signal output by the CPU on the main board is connected to the first PCIE slot, then connected to the riser board, and finally connected to a main control chip of the target smart NIC through the second PCIE slot and the second gold finger.

10. The method as claimed in claim 1, wherein the smart NIC has a field replaceable unit, the field replaceable unit stores indication information on whether a power signal, a clock signal and a reset signal are required to be provided for the main board, by the smart NIC, in a device shutdown state or in a device active state, and the FPGA in the main board is connected to a riser board through the I2C interface and then connected to the field replaceable unit in the smart NIC.

11. The method as claimed in claim 10, wherein the main board further comprises a voltage regulator chip and a clock buffer, and the sending, by the main board, a clock control signal and a power control signal to the target smart NIC comprises:
sending, by the FPGA, an enable signal to the voltage regulator chip and the clock buffer in the device shutdown state under the condition that the FPGA knows from the power on indication information from the field replaceable unit of the smart NIC that the power signal, the clock signal and the reset signal are required to be provided for the smart NIC in the device shutdown state; and
respectively sending, by the voltage regulator chip and the clock buffer, the power signal and a 100 Mhz clock signal, and transmitting same to a main control chip of the target smart NIC through the riser board.

12. The method as claimed in claim 1, the bandwidth type refers to different types and numbers of PCIE slots, the bandwidth types include: 1×16 slot, 2×8 slots, 4×4 slots, 8×2 slots and 16×1 slots.

13. A method for powering on a smart NIC, comprising:
sending power on indication information to a main board by a target smart NIC, and causing the main board to adjust a working state to a target working state according to the power on indication information, wherein the power on indication information is configured to indicate a target power on state required by the target smart NIC, and the target power on state corresponds to the target working state of the main board;
receiving a clock control signal and a power control signal that are sent by the main board and getting powered on according to the clock control signal and the power control signal by the target smart NIC; and sending interface bandwidth information to the main board by the target smart NIC, causing the main board to perform bifurcation on a communication bandwidth according to the interface bandwidth information, and obtaining a target bandwidth type matching the target smart NIC, wherein the interface bandwidth information comprises a bandwidth type;

wherein the target smart NIC comprises a field replaceable unit, and the sending power on indication information to a main board by a target smart NIC comprises:

receiving an obtainment request from the main board by the field replaceable unit through an I2C interface; and sending the power on indication information by the field replaceable unit under the condition of receiving the obtainment request.

14. The method as claimed in claim 13, wherein the sending interface bandwidth information to the main board by the target smart NIC comprises:

sending an indication signal to a riser board by the target smart NIC, and causing the riser board to forward the indication signal to the main board, wherein a numerical value of the indication signal is configured to indicate the bandwidth type.

15. The method as claimed in claim 13, further comprising: receiving a reset signal from the main board by the target smart NIC.

16. The method as claimed in claim 13, further comprising: in the case where the target smart network interface card is recognized by a CPU in the main board, operating upper layer of services by the target smart NIC.

17. A method for powering on a smart NIC, comprising:
obtaining power on indication information from a target smart NIC by a riser board, wherein the power on indication information is configured to indicate a target power on state required by the target smart NIC, and the target power on state corresponds to a target working state of a main board;

forwarding the power on indication information to the main board by the riser board, causing the main board to adjust a working state to the target working state and send a clock control signal and a power control signal, and powering on the target smart NIC according to the clock control signal and the power control signal that are received, wherein the main board comprises a FPGA, the target smart NIC comprises a field replaceable unit, the FPGA sends an obtainment request to the target smart NIC through an I2C interface, the field replaceable unit receives an obtainment request from the main board through the I2C interface and sends the power on indication information, the riser board obtains the power on indication information from the target smart NIC;

obtaining interface bandwidth information of the target smart NIC by the riser board, wherein the interface bandwidth information is configured to indicate a bandwidth type of the target smart NIC; and forwarding the interface bandwidth information to the main board by the riser board, causing the main board to perform bifurcation on a communication bandwidth according to the interface bandwidth information, and obtaining a target bandwidth type, wherein the target bandwidth type is configured to match the bandwidth type of the target smart NIC.

18. The method as claimed in claim 17, wherein a first PCIE slot is provided in the main board, a first gold finger on the riser board is inserted into the first PCIE slot on the main board for interconnection, a second PCIE slot is further provided arranged in the riser board, and a second gold finger on the target smart NIC is inserted into the riser board for interconnection.

19. The method as claimed in claim 17, wherein the FPGA in the main board is connected to the riser board through the I2C interface and then connected to the field replaceable unit in the smart NIC.

20. The method as claimed in claim 17, wherein a first PCIE slot is provided in the main board, a first gold finger on the riser board is inserted into the first PCIE slot on the main board for interconnection, a second PCIE slot is further provided arranged in the riser board, and a second gold finger on the target smart NIC is inserted into the riser board for interconnection.

* * * * *